May 29, 1923.

R. N. FLEMING

COUPLED LIGHT DISSOLVER FOR MOTION PICTURE MACHINES

Filed Nov. 10, 1921

Inventor

Roger N. Fleming

By Lancaster and Allwine

Attorneys

May 29, 1923.
R. N. FLEMING
COUPLED LIGHT DISSOLVER FOR MOTION PICTURE MACHINES
Filed Nov. 10, 1921
1,456,544
2 Sheets-Sheet 2
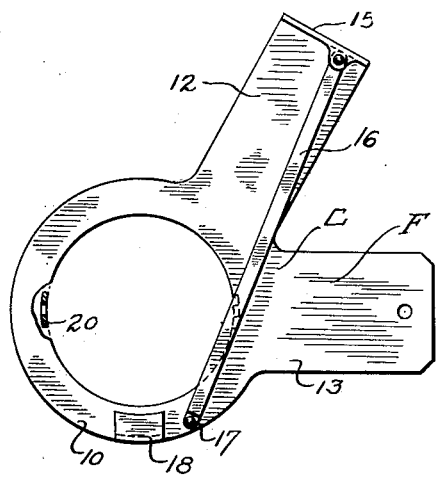
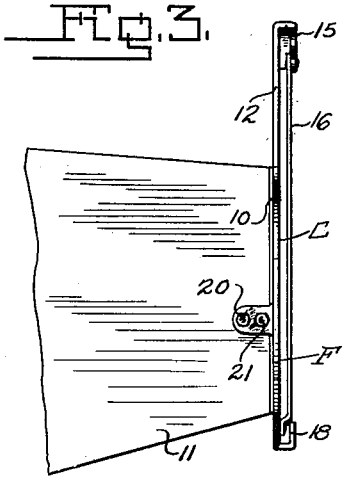
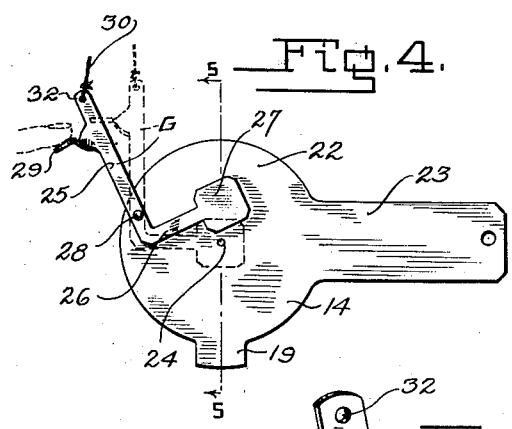
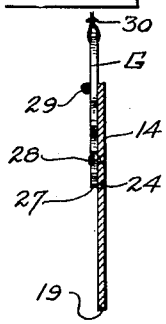
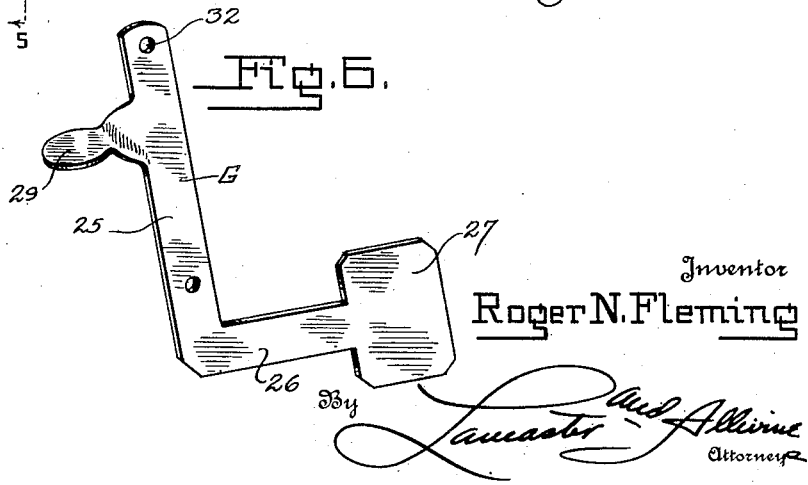

Patented May 29, 1923.

1,456,544

UNITED STATES PATENT OFFICE.

ROGER N. FLEMING, OF DETROIT, MICHIGAN.

COUPLED LIGHT DISSOLVER FOR MOTION-PICTURE MACHINES.

Application filed November 10, 1921. Serial No. 514,330.

*To all whom it may concern:*

Be it known that I, ROGER N. FLEMING, a citizen of the United States, residing at Detroit, in the county of Wayne and State of Michigan, have invented certain new and useful Improvements in Coupled Light Dissolvers for Motion-Picture Machines, of which the following is a specification.

This invention relates to motion picture apparatus and the primary object of the invention is the provision of a novel means for permitting the simultaneous actuation of the light cut off members of motion picture machines, when two motion picture machines are used in connection with one another for permitting the continuous projection of a picture without the stopping of a picture to change reels and the like.

In modern motion picture projection two moving picture machines are used so as to eliminate stops between reels and thus give continuous production by cutting off the projection of one machine at the end of a reel of film and starting the projection of the next reel or film at the moment the first reel is through so that this operation is unnoticed to the audience. This actuation must be done with great accuracy as double projection or a partially dark screen will result. Heretobefore independently manually operable light darkeners or dissolvers have been used on each machine independent of the other. This has resulted in a blur or not a clear projection between the starting and stopping of the machines.

It is therefore a prime object of the invention to provide a simple and durable means for operably connecting light dissolvers or dousers of the machines together, so that when one douser or light dissolver is actuated to cut off the projection of one machine, the other light dissolver will be lifted so as to permit the projection of the other machine.

A further object of the invention is the provision of a light trip carried by each one of the light dissolvers for eliminating the arc-crater-spot from going through the aperture located in rear of the fire shutter and thus eliminate the showing of the arc crater of the machine which is not being used while the other machine is being used.

A further object of the invention is the provision of a pivoted trip lever carried by each one of these dissolvers for permitting the centering of the arc-crater-spot on to the fire shutter before starting a projection with the machine which is not being used without the necessity of actuating the dissolver.

With these and other objects in view, the invention consists in the novel construction, arrangement and formation of parts, as will be hereinafter more specifically described, claimed and illustrated in the accompanying drawings, forming a part of this specification, in which drawings:

Figure 2 is a front elevation partly in section of the frame for the light dissolver.

Figure 3 is a side elevation of the frame showing the same in position on the forward portion of a motion picture machine.

Figure 4 is a front elevation of the light dissolver and the light trip carried thereby, showing this trip in its actuated position for permitting the centering of the arc-crater-spot.

Figure 5 is a detail section through the dissolver taken on the line 5—5 of Figure 4.

Figure 6 is a detail perspective view of one of the light trips.

Figure 1:
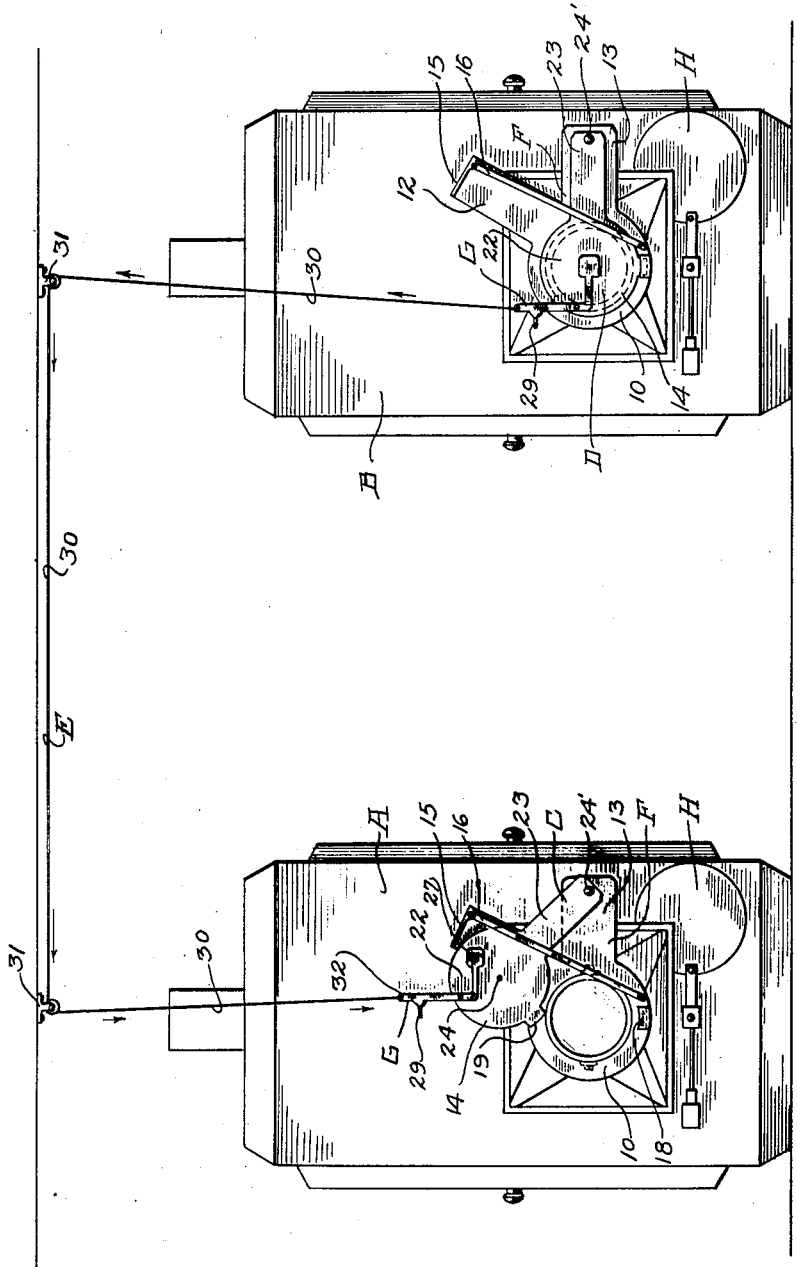
Figure 1 is a front elevation of a pair of motion picture projecting machines showing the novel light dissolvers and the novel means for connecting the dissolvers together for synchronous movement.

Referring to the drawings in detail, wherein similar reference characters designate corresponding parts throughout the several views, the letters A and B indicate a pair of motion picture machines; C and D the novel light dissolvers therefor; and E, the means for operatively connecting the dissolvers C and D of the machines A and B together for synchronous operation.

The light dissolvers C and D are constructed identically the same and therefore a description of one will be sufficient for both. It can be seen that there is a frame for each dissolver and that this frame is connected directly with the motion picture projecting machine.

Each frame is designated by the reference character F and consists of an annular plate 10 for the reception of the light hood 11 of the picture projecting machine. This ring 10 is provided with a pair of outwardly extending angularly related arms 12 and 13. The arm 13 is disposed in a horizontal plane and is adapted to pivotally support the light dissolver plate 14 which is normally held in a lowered position by its own weight. The arm 12 has its upper end provided with an inwardly extending flange 15 and this flange supports a depending guide rod 16 for the dissolver plate 14. The lower end of the guide rod 15 is secured as at 17 to the annular plate 10. A stop or rest 18 is also carried by the annular plate 10 adjacent to its lower end for receiving a lug 19 formed on the dissolver plate 14 and this holds the dissolver plate in its correct position in relation to the light hood 11 of the projecting machine. The annular plate 10 may be provided with rearwardly extending right angularly disposed ears 20, which may be bolted or otherwise secured as at 21 to the forward end of the light hood 11 of the picture projecting machine. The light dissolver plate 14 consists of a disc shaped body 22 and a radially extending arm 23, the outer end of which receives the pivot pin 24' that pivotally connects the dissolver plate to the arm 13. The periphery of the disc portion 22 of the dissolver plate 14 is provided with the lug 19, which is adapted to engage the stop 18. The axial center of the shaped body plate 22 of the dissolver plate 14 is provided with an opening 24 of relatively small diameter which forms means for centering the arc crater of the machine in reference to the motion picture screen. This opening is normally closed by a light trip G which will now be described.

This light trip G includes a pair of angularly related arms 25 and 26 and the forward end of the arm 26 has formed thereon the relatively small plate 27, which is adapted to normally cover the opening 24. The light trip G is in the nature of a bell crank and is pivotally mounted adjacent to its angle upon a pivot pin 28 which is carried by the disc body portion 22 of the dissolver plate 14. The arm 25 of the light trip has formed thereon a suitable outwardly extending finger piece 29 as clearly shown in Figures 4 and 6 of the drawings and this finger piece permits the light trip to be readily rocked on the pivot pin 28 in order to move the plate 27 from out of the path of the opening 24 when it is desired to center the arc crater.

The means E for operatively connecting the light dissolvers C and D together of the machines A and B consists of a cable 30, which is trained about suitable guide pulleys 31 which may be supported in any preferred manner, such as by the ceiling of a projecting roof. The terminals of the cable 30 are connected respectively to suitable eyes 32 formed on the upper ends of the arms 25 of the light trips G of the dissolvers C and D.

In the use of the improved light dissolvers when it is desired to cut off the projection of one machine and permit the projection of the other machine, it is merely necessary to pull down on the dissolver plate 14 of the dissolver mechanism of the machine on which the projection is desired to be stopped. This will move the plate 14 over the light hood of one machine and lift the plate 14 away from the light hood of the other machine. This is permitted owing to the means of connecting the light dissolver plates 14 together. Thus, as shown in Figure 1 of the drawings, the machine A is in operation and when the end of the film is reached, it is merely necessary to lower the plate 14 of mechanism C to automatically and synchronously raise the plate 14 of the mechanism D.

It is to be understood, however, that the light dissolver plates 14 may be operated from either machine, and thus if the operator were standing near the machine B and desired to start the projection of the machine B, it would merely be necessary for him to lift up the plate 14 of the light dissolver mechanism D and the plate 14 of the mechanism C will automatically lower itself by its own weight. Now when the plates 14 swing into their lower operative position, the portions 27 of the light trips G are automatically moved by gravity over the openings 24. This is clearly shown in Figure 1 of the drawings.

Now when it is desired to center the arc crater of the machine for the projection of a machine, it is merely necessary to press down upon the finger piece 29 which will rock the light trip on its pivot 28 and move the plate 27 from out of the path of the opening 24. This will permit a relatively small volume of light to escape through the opening 24, which will be sufficient to permit the ready centering of the arc crater. This is of course accomplished by suitable manipulation of the arc lamp adjusting screws.

It is to be noted that the machines A and B may also be provided with the usual douser or dissolver plates H.

From the foregoing description, it can be seen that a simple and effective means has been provided for simultaneously and synchronously cutting off the projection of one machine and starting the projection of another machine.

Changes in details may be made without departing from the spirit or scope of this invention; but,

I claim:

1. The combination with a pair of spaced moving picture projecting machines, of a light dissolver attachment therefore for permitting the simultaneous cutting off of one machine and the simultaneous projection of the other machine and consisting of a frame secured to each one of the machines, a dissolver plate secured to each frame for movement toward and away from the path of the projection means and having a relatively small opening therein, light trip levers pivotally secured to each plate, for normally closing said openings and a flexible cable connected to said light trip levers.

2. In a light dissolver for motion picture machines, the combination of a pivoted light dissolver plate having an axial opening therein, and a pivoted trip plate arranged to normally close said opening.

3. In a light dissolver for motion picture machines, a pivoted light dissolver plate for movement into and out of the path of the projector light rays, said plate having an axial opening formed therein, a pivoted light trip secured to the plate, means formed on the light trip for normally overlying the opening, and a finger piece formed on the light trip for permitting the movement of said plate from out of the path of said opening.

4. The combination with a pivoted light dissolver plate having an axial opening therein, of a light trip for the dissolver plate including a pair of angularly related arms, means pivotally securing the light trip adjacent to its angle to the light dissolver plate, a foot formed on the lower arm of said light trip for normally overlying the opening in the light dissolver plate, and means for permitting the actuation of said light trip.

5. The combination with a motion picture machine, of a light dissolver plate therefor having an opening therein, and means carried by said plate for movement over and away from said opening whereby the centering of the arc crater can be accomplished without the operation of said plate.

ROGER N. FLEMING.